Oct. 1, 1929.  K. KILCHLING  1,729,836
TORSION BALANCE
Filed Nov. 18, 1926
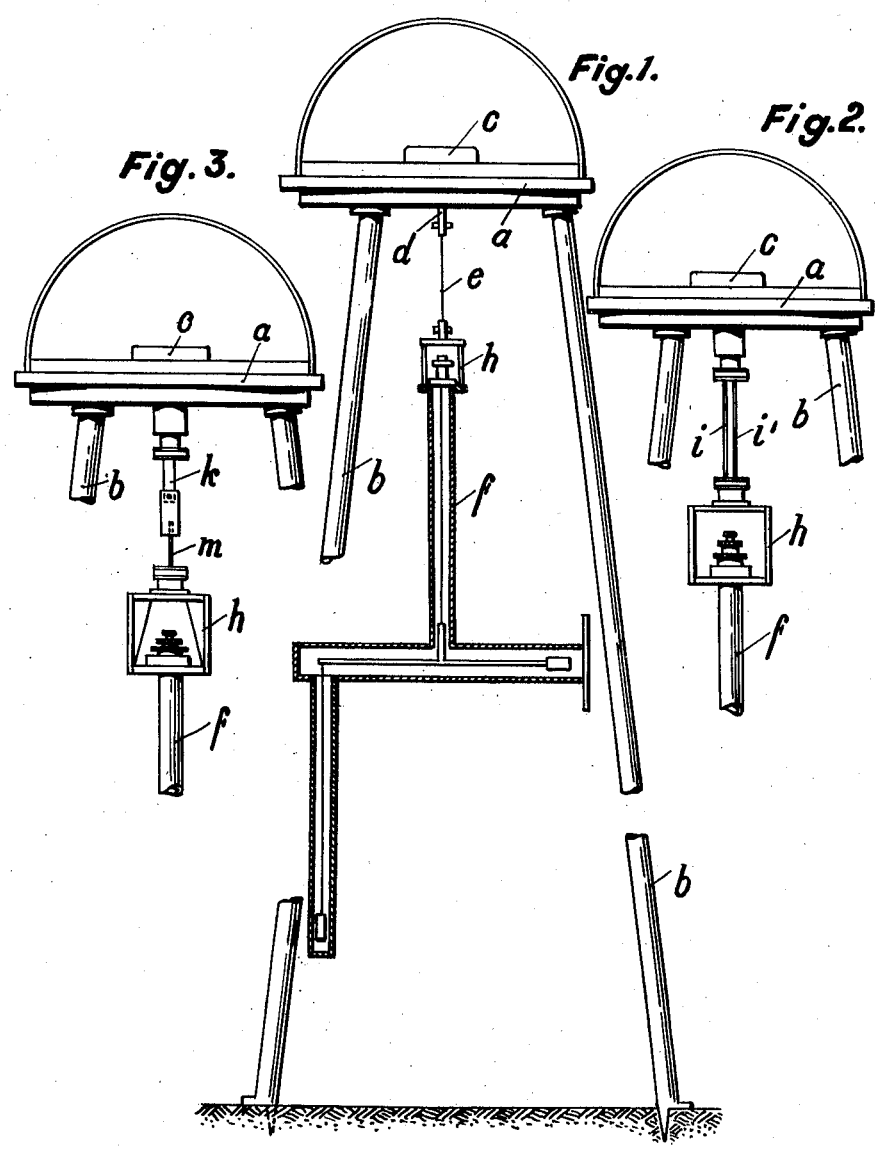
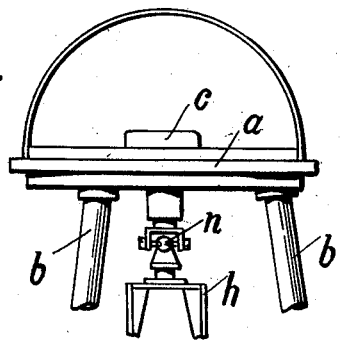
Inventor:
Dr. Karl Kilchling
by Dr. Fisch,
attorney Patented Oct. 1, 1929

1,729,836

UNITED STATES PATENT OFFICE

KARL KILCHLING, OF FREIBURG, GERMANY

TORSION BALANCE

Application filed November 18, 1926, Serial No. 149,134, and in Germany November 21, 1925.

My invention relates to improvements in torsion balances of the Eötvös type. When effecting gravity measurements with a torsion balance of this type a fundamental requirement is that the torsion axis be adjusted vertically very accurately. To level the balance tubular levels allowing of an accuracy down to five arc seconds are used, and adjusting the balance forms a material part of the measurement.

The new arrangement and combination of parts renders the levelling superfluous, in that the balance adjusts itself automatically. For this purpose the rotary coinical member generally used with the known torsion balances is replaced by flexibly suspending the entire balance from its suspending means, for instance by means of a wire, and by turning this wire or its equivalent. It is, practically, of no consequence whether or not the wire participates in the turning. Instead of a single wire bifilar suspension from two wires or bands may be employed, or steel springs or universal or Cardan-suspensions may be ued. Generally, every means or device can be made use of which permits the balance to be flexibly and vertically suspended.

With some of these means or devices the advantage is included that the balance turns free of shocks. That is true of all those means or devices for the purpose in view which allow of a torsion of the suspension member itself.

As regards uniformly turned torsion balances it has been found that the suspension members of the balance beam turn perfectly uniformly even if the upper end of the torsion wire is turned in a jerky manner, or intermittently, for instance by a clock-work. The degree of the uniformity depends, according to physical laws, upon the relation between the length of time of an oscillation and the length of time of a jerky movement. By determining suitably the magnitudes upon which the length of time of an oscillation depends, such as the moment of inertia and the directional force, the want of uniformity will completely disappear. With the normal suspension means the conditions are favorable per se. If, according to the present invention, the entire torsional balance is suspended, the time of oscillation of the entire suspended instrument can be so proportioned that the turning proceeds uniformly even if the upper end of the suspension member is turned intermittently or in a jerky manner. Experiments have shown that the want of uniformity is less than a few arc seconds. This means that for uniformly turning of a torsional balance a clock work may be employed instead of a continually uniformly running wheel work, and that the great accuracy of a clock-work can be fully utilized.

The invention is illustrated diagrammatically and by way of example on the accompanying drawing on which Figure 1 is partly a side view of, and partly a section through, a torsion balance suspended according to this invention, the balance being suspended in this example from one thread or wire;

Fig. 2 shows a modification in which the balance is suspended from two threads or wires;

In Fig. 3 the balance is suspended from a steel spring, and

In Fig. 4 it is suspended by means of a universal or Cardan joint.

With all constructional forms shown by way of example $a$ denotes the plate of a supporting frame $b$ upon which a driving mechanism $c$ is mounted. This mechanism may be of any ordinary kind. A downwardly projecting axle or shaft $d$ transmits the motion to the torsion balance. In Figure 1 a wire $e$ is attached to the shaft $d$, and a frame or casing $h$ carrying the torsion balance casing $f$ is suspended from said wire. The torsion balance arranged in the casing $f$ may be of any desired approved type. The casing $f$ with the balance in it can be turned either intermittently or uniformly from azimuth to azimuth.

Figure 2 differs from Figure 1 solely therein that the torsion balance is suspended not from one wire $e$, but from two threads or bands $i$ and $i^1$.

In Figure 3 the balance is suspended by means of a steel spring $k$ which is attached to the frame or casing $h$ either directly or by the intermediary of a short thread $m$.

Finally, in Figure 4, a universal or Cardan joint $n$ is employed which is arranged between the frame or casing $h$ and the plate $a$; this joint permits adjustment of the balance on two axles located at right angles relatively to one another so that also in this case an accurately vertical adjustment of the torsion balance is rendered possible.

I claim:

1. A torsion balance of the Eötvös type, comprising, in combination, a torsion balance casing, a supporting means and flexible means for suspending the said casing from said first named means.

2. A torsion balance of the Eötvös type, comprising, in combination, a torsion balance casing, a supporting frame and flexible means for suspending said casing from said frame.

3. A torsion balance of the Eötvös type, comprising, in combination with the torsion balance proper, a casing carrying this balance, a supporting means, and flexible means for suspending the said casing from said first named means.

4. A torsion balance of the Eötvös type comprising, in combination, a torsion balance casing, flexible means for suspending it, means from which it is suspended and means for turning said casing at said suspension means.

5. A torsion balance of the Eötvös type, comprising, in combination with the torsion balance proper, a casing carrying this balance, flexible means for suspending said casing means from which said casing with the balance proper is suspended, and means for turning the said casing by means of the said suspension means.

6. A torsion balance of the Eötvös type, comprising, in combination, a torsion balance casing, a supporting means and flexible means for suspending said casing from first named means, said suspension, means having torsional elasticity.

7. A torsion balance of the Eötvös type, comprising, in combination, a torsion balance casing, a supporting frame, a wire for suspending said casing from said frame, and means inserted between said casing and said wire and adapted to turn said casing by means of the said wire.

8. A torsion balance of the Eötvös type, comprising, in combination, a torsion balance casing, a supporting frame, a wire having torsional elasticity and serving for suspending said casing from said frame, and means inserted between said casing and said wire and adapted to turn said casing by means of the said wire.

In testimony whereof I have affixed my signature.

Dr. CARL KILCHLING, Prof.